US007077891B2

(12) United States Patent
Jaffe et al.

(10) Patent No.: US 7,077,891 B2
(45) Date of Patent: Jul. 18, 2006

(54) ADSORBENT SHEET MATERIAL FOR PARALLEL PASSAGE CONTACTORS

(75) Inventors: Stephen Mosheim Jaffe, Lake Forest, CA (US); Cristian Ion Contescu, Redondo Beach, CA (US)

(73) Assignee: Air Products and Chemicals, Inc., Allentown, PA (US)

( * ) Notice: Subject to any disclaimer, the term of this patent is extended or adjusted under 35 U.S.C. 154(b) by 51 days.

(21) Appl. No.: 10/639,157

(22) Filed: Aug. 11, 2003

(65) Prior Publication Data

US 2004/0118287 A1 Jun. 24, 2004

(51) Int. Cl.
*B01D 53/47* (2006.01)
(52) U.S. Cl. .............................. 96/108; 96/125; 96/135; 96/154; 88/514; 88/521
(58) Field of Classification Search ................. 96/108, 96/125, 130, 135, 153, 154; 55/514, 520, 55/521, DIG. 5
See application file for complete search history.

(56) References Cited

U.S. PATENT DOCUMENTS

| | | | | |
|---|---|---|---|---|
| 3,687,297 A | * | 8/1972 | Kuhn et al. ............... 210/502.1 |
| 3,721,072 A | * | 3/1973 | Clapham ..................... 96/153 |
| 3,783,085 A | * | 1/1974 | Pearson et al. ............. 442/267 |
| 3,919,369 A | * | 11/1975 | Holden ....................... 264/45.1 |
| 4,013,566 A | * | 3/1977 | Taylor ......................... 502/62 |
| 4,153,661 A | | 5/1979 | Ree et al. ................... 264/120 |
| 4,194,892 A | | 3/1980 | Jones et al. ..................... 55/58 |
| 4,354,859 A | | 10/1982 | Keller, II et al. ................ 55/25 |
| 4,373,519 A | | 2/1983 | Errede et al. ................ 128/156 |
| 4,379,772 A | | 4/1983 | Solomon et al. .............. 264/49 |
| 4,460,642 A | | 7/1984 | Errede et al. ................ 428/283 |
| 4,468,362 A | | 8/1984 | Solomon ..................... 264/127 |
| 4,500,647 A | | 2/1985 | Solomon ..................... 502/101 |
| 4,518,704 A | * | 5/1985 | Okabayashi et al. .......... 502/80 |
| 4,565,663 A | | 1/1986 | Errede et al. ................ 264/120 |
| 4,585,711 A | | 4/1986 | Vaidyanathan ............... 429/42 |
| 4,810,381 A | | 3/1989 | Hagen et al. ............. 210/502.1 |
| 4,906,378 A | | 3/1990 | Hagen et al. ................ 210/635 |
| 4,992,084 A | * | 2/1991 | Von Blucher et al. ........ 96/131 |
| 5,071,610 A | | 12/1991 | Hagen et al. ................ 264/120 |
| 5,256,476 A | * | 10/1993 | Tanaka et al. ................. 442/1 |
| 5,332,426 A | * | 7/1994 | Tang et al. ..................... 96/153 |
| 5,338,340 A | * | 8/1994 | Kasmark et al. ............. 96/135 |
| 5,505,769 A | * | 4/1996 | Dinnage et al. .............. 96/153 |
| 5,510,063 A | * | 4/1996 | Gadkaree et al. ........... 264/29.7 |
| 5,636,437 A | | 6/1997 | Kaschmitter et al. ......... 29/825 |
| 5,665,148 A | * | 9/1997 | Muhlfeld et al. ............. 96/153 |
| 5,733,451 A | * | 3/1998 | Coellner et al. ............. 210/496 |
| 5,738,790 A | | 4/1998 | Hagen et al. |
| 5,891,402 A | | 4/1999 | Sassa et al. |
| 5,951,744 A | * | 9/1999 | Rohrbach et al. ............. 96/154 |
| 5,972,077 A | | 10/1999 | Judkins et al. |
| 6,176,897 B1 | | 1/2001 | Keefer ............................ 95/98 |
| 6,228,152 B1 | * | 5/2001 | Guerin et al. ................. 96/135 |
| 6,277,179 B1 | * | 8/2001 | Reymonet ..................... 96/153 |
| 6,302,946 B1 | * | 10/2001 | Cronia et al. ................. 96/154 |
| 6,352,578 B1 | * | 3/2002 | Sakata et al. ................. 96/134 |
| 6,379,438 B1 | * | 4/2002 | Schneider et al. ............ 96/154 |
| 6,413,303 B1 | * | 7/2002 | Gelderland et al. ........... 96/135 |
| 6,451,723 B1 | * | 9/2002 | Gaita et al. ................... 502/62 |
| 6,652,629 B1 | * | 11/2003 | Wolff et al. ................... 96/131 |
| 6,758,885 B1 | * | 7/2004 | Leffel et al. .................. 96/134 |
| 2001/0027723 A1 | * | 10/2001 | Jain et al. ......................... 95/96 |
| 2002/0073847 A1 | * | 6/2002 | Sheline et al. ................ 95/143 |
| 2003/0041733 A1 | * | 3/2003 | Seguin et al. ................. 96/108 |
| 2003/0066427 A1 | * | 4/2003 | Ishida ........................... 96/135 |
| 2003/0089092 A1 | * | 5/2003 | Bause et al. .................. 55/524 |
| 2003/0177909 A1 | * | 9/2003 | Koslow ........................ 96/154 |
| 2003/0183083 A1 | * | 10/2003 | Fu et al. ........................ 96/153 |
| 2003/0192512 A1 | * | 10/2003 | Luley et al. ................ 123/519 |
| 2004/0079344 A1 | * | 4/2004 | Gimby et al. .............. 123/519 |
| 2004/0099253 A1 | * | 5/2004 | Tschantz .................... 123/518 |
| 2004/0118287 A1 | * | 6/2004 | Jaffe et al. .................... 96/121 |

OTHER PUBLICATIONS

H-S Shin, et al., *AIChE Journal*, "Pressure Swing Adsorption: A Theoretical Study of Diffusion-Induced Separations", vol. 33, pp. 654-662 (1987).
H-S Shin, et al, *AIChE Journal*, "Pressure Swing Adsorption: An Experimental Study of Diffusion-Induced Separation", vol. 34, pp. 1409-1416 (1988).
S. Farooq, et al., *Separation and Purification Technology*, "Numerical Simulation of a Parallel-Passage Piston-Driven PSA Unit", vol. 13, pp. 181-193 (1998).
Chung, et al., "Short-cut evaluation of pressure swing adsorption systems", Computers Chem. Engng, 1998, vol. 22, pp. S637-S640, Elsevier Science Ltd., Great Britain.
Ruthven, et al., "Performance of a parallel passage adsorbent contactor", Gas. Sep. Purif., 1996, vol. 10, No. 1, pp. 63-73, Elsevier Science Ltd., Great Britain.

* cited by examiner

*Primary Examiner*—Robert H. Spitzer
(74) *Attorney, Agent, or Firm*—Anne B. Kiernan

(57) ABSTRACT

An adsorbent material fabricated into a reinforcement-free, self-supported coherent thin sheet and configured for use as a parallel passage contactor element in adsorption/separation applications with gases and liquids is disclosed. The adsorbent sheet material is obtained by enmeshing fine adsorbent particulates in a polymer binder. Particulates include but are not limited to carbon particles, inorganic oxides particles, or ceramic particles, or synthetic polymer resin particles. The adsorbent sheet advantageously contains a large volume percentage of active adsorbent particles. The parallel passage contactor device fabricated from the adsorbent sheet material is characterized by minimal mass transfer resistance and better separation efficiency expressed as height equivalent to a theoretical plate, while it maintains most of the adsorptive properties of the starting particulates, and can be used in gas separation applications with short adsorption cycles, such as rapid pressure swing adsorption, rotary concentrators, rapid electric swing adsorption.

30 Claims, 10 Drawing Sheets

ADSORBENT SHEET MATERIAL FOR PARALLEL PASSAGE CONTACTORS

BACKGROUND OF THE INVENTION

1. Field of Invention

This invention discloses an adsorbent material fabricated into a self-supported coherent sheet and configured for use as a parallel passage contactor.

2. Prior Art

Traditional mass transfer devices for adsorption process include monoliths (e.g. honey combs), cloth (e.g. activated carbon fiber cloth) and packed bed of adsorbent particles. The packed bed is cheap and versatile, but quite inefficient in operation at high flow rate regimes due to the high costs associated to the large internal pressure drop. Calculations by Ruthven and Thaeron (in Gas. Sep. Purif. vol. 10, (1996) p. 63) have shown that a significant improvement in the mass transfer/pressure drop characteristics over the packed bed configuration could be achieved with parallel passage contactors. These are mass transfer devices in which the gas passes in laminar flow through straight channels between equally spaced parallel sheets of adsorbent. Rapid mass transfer enables rapid cycling and smaller devices. One application of parallel passage contactors is Pressure Swing Adsorption (PSA).

PSA has become of interest for small-scale gas separation applications because of its potential for high separation performance (product purity and recovery) compared with other gas separation technologies. Depending on the actual mechanism, PSA separations could be categorized as equilibrium or kinetically (diffusion) controlled. An example for the first category is separation of air on zeolite 5 Å into almost pure nitrogen and oxygen streams based on differences in equilibrium adsorption isotherms between nitrogen and oxygen. An example for the second group is the same separation carried out on zeolite 4 Å, where the mechanism is based on the differences in diffusion rates between nitrogen and oxygen, which have different effective kinetic diameters (3.46 Å and 3.64 Å, respectively). While the equilibrium based PSA separation has been relatively well established theoretically and already commercialized for some applications, the diffusion-induced PSA still needs theoretical development and is not fully commercialized. The reader is referred to several recent publications such as by Shin and Knaebel, in AIChE Journal, vol. 33, p. 654 (1987), and vol. 34, p. 1409 (1988); by Chung and others, in Computers Chem. Engn. Vol. 22, Suppl., p. S637 (1998); and to the "Pressure Swing Adsorption" monograph book by Ruthven, Farooq and Knaebel, VCH Publisher, 1994.

Another way for optimization of PSA in terms of enhancing the adsorbent productivity at equal recovery and product purity parameters is through shortening the cycle times. Enhanced adsorbent productivity results in reducing the cost and foot print size of PSA beds. When the intra particle diffusion limits the rate of mass transfer in PSA, one way to shorten the cycle times is by using adsorbent with very small particle sizes. This was demonstrated first in U.S. Pat. No. 4,194,892, where relatively small particles of adsorbent were used in a packed bed configuration at cycle times of less than 30 seconds, with substantially higher product recovery than in previous art. U.S. Pat. No. 4,354,859 demonstrated a further increase in productivity by executing rapid cycle PSA with two pistons operating out-of-phase at the ends of the adsorption column.

However, the gas separation efficiency in rapid cycle PSA, as described by U.S. Pat. Nos. 4,194,892 and 4,354,859, is limited by the pressure drop in the randomly packed bed column. To circumvent this, Farooq, Thaeron and Ruthven (Sep. Pur. Tech., vol. 13 (1998) p. 181–193) suggested combining piston-driven rapid cycle PSA with parallel passage contactors, thus providing an economical solution to older separation technologies such as air drying, air separation, and VOC removal. Based on numerical simulation models developed by Ruthven and Thaeron (Gas Sep. Purif. vol. 10 (1996) 63–73), for example, a parallel passage contactor with sheet thickness of about 500 to 800 µm and sheet spacing of about 100 µm should be well suited to rapid cycle adsorption processes for $CO_2/N_2$ separation. The adsorbent described by Ruthven and Thaeron was activated carbon fiber (ACF) sheet with fiber diameters of 10–15 µm. For this adsorbent characteristic length, the optimal cycle frequency was 10–20 rpm, the rate being limited by the inter particle, macro pore diffusion. However, it became evident for those who tried to use carbon fiber adsorbent in woven or non-woven form in rapid cycle PSA systems that a great disadvantage of these materials is that they are not dimensionally stable.

Further increase in cycle frequency and thus more performance improvement of the separation process is possible in principle by using even smaller adsorbent particles (about 10 µm in size). Problems with small particles in packed beds subjected to high flow velocities include particle break up, particle attrition from the bed, and particle fluidization. U.S. Pat. No. 6,176,897 teaches a high frequency pressure swing adsorption system in which granular adsorbent beds are replaced by a high surface area adsorbent monolith or layered support, with adsorbent elements formed of layered or laminated sheet materials using fibrous reinforcements (such as glass, carbon or kevlar fibers) which support zeolite loaded composites in adsorbent sheets. However, the availability of materials that could be successfully used for fabrication of such adsorbent structures is limited. Also, the use of reinforcement materials limits the adsorption capacity per volume of adsorption bed, because a relatively large fraction of the adsorbent bed volume, associated with the reinforcement structures, is not effectively used for adsorption.

It was demonstrated that inorganic adsorbent particles with sizes in the range of tens to hundreds of nanometers (also called adsorbent nanoparticles) have enhanced adsorption and chemical surface reactivity due to the very high ratio of surface atoms to bulk atoms. For more information, the reader is directed to the recently published book entitled "Nanoscale Materials in Chemistry" (Wiley, 2001) by Klabunde. However, integrating adsorbent nanoparticles into usable sorptive materials has been a challenge so far. Efficient means for binding, stabilizing or incorporating adsorbent particles with sizes in the nanometer range in structures that can be used for adsorption and separation applications are deemed necessary.

Recently, sorptive materials based on polytetrafluoroethylene (PTFE) matrix have been described in the patent literature. U.S. Pat. Nos. 4,810,381 and 4,906,378 describe a chromatographic sorptive material composed of PTFE fibril matrix and non-swellable adsorbent particles enmeshed in the matrix U.S. Pat. Nos. 4,153,661 and 5,071,610 disclose manufacturing methods and uses of composite sheet materials comprised of fine, non-swellable adsorbent particles held by a fibrillated polymer matrix, and methods for the control of internal porosity. The resulting sheet is extremely pliable and it is said to be useful as an electronic insulator or semi permeable membrane. U.S. Pat. No. 4,373,519 discloses a composite wound dressing comprising hydrophilic absorptive particles enmeshed in a PTFE matrix. U.S. Pat. Nos. 4,565,663 and 4,460,642 disclose water swellable composite sheets having a PTFE matrix in which are enmeshed swellable hydrophilic sorptive particles. However, sorptive materials obtained by enmeshing particulate sorbents, in a fibrillated PTFE matrix with specification for use as a parallel passage contactor have not been disclosed.

Self-supported porous membranes obtained by compacting micron-size carbon particles and fibrillated PTFE could also be used as porous electrodes in electrochemical applications. The U.S. Pat. No. 4,585,711 teaches a hydrogen electrode for a fuel cell obtained by roll compaction of granular PTFE and platinum-covered carbon black particles. The U.S. Pat. No. 4,379,772 disclosed a method for forming an active layer electrode for fuel cells in which granules of active carbon are mixed with fibrillated PTFE and rolled into a self-supported, coherent sheet form. U.S. Pat. No. 4,468,362 discloses a method for preparing a self-sustained electrode-backing layer with excellent electrical conductivity through dispersing PTFE particles and finely divided carbon black particles (50 to 3000 Å). U.S. Pat. No. 4,500,647 teaches the preparation of three-layer matrix electrodes for fuel cell or other electrochemical applications in which active carbon particles are present within an unsintered carbon black-fibrillated PTFE material. U.S. Pat. No. 5,636,437 discloses a fabrication method of solid carbon porous electrodes from various carbon powders and thermoset resin binders. These un-reinforced, self-supporting sheets have not been specified for use as a parallel passage contactor. The prior art is limited to adsorbent cloths or reinforced sheets for parallel passage applications.

BRIEF SUMMARY OF THE INVENTION

This invention discloses an adsorbent material fabricated into a reinforcement-free, self-supported coherent sheet, and configured for use as a parallel passage contactor. The adsorbent material is obtained by enmeshing fine adsorbent particulates, including but not limited to carbon particles, inorganic oxide particles, or ceramic particles, or synthetic polymer resins. For the purpose of the present invention, the characteristic length of these particles is in the range from 0.01 µm to 100 µm. The sheet material is a high surface-to-volume composite, characterized by sheet surface area to total sheet volume ratio in the range of 200 to 2500 $m^2/cm^3$ and the sheet micro pore volume to total sheet volume ratio is in the range of 0.1 to 0.9. For use as a parallel passage contactor, the sheet material is configured in the form of flat parallel layers with gaps between adjacent sheets, or is corrugated, or is embossed, or is spiral wound, or is in any other form that allows the gas to flow parallel to the sheet surface. The material configured as parallel passage contactor can be used in many gas separation applications, or liquid applications, where fast adsorption, low pressure drop, and minimal mass transfer resistance are essential, such as in rapid cycle pressure swing adsorption. Examples of preferred uses of parallel passage contactor devices manufactured with the material disclosed in the present invention include but are not limited to hydrogen purification and air separation by rapid cycle pressure swing adsorption, air desiccation and VOC abatement by HVAC rotary wheel technology, rapid gas capture and controlled release for adsorbed natural gas fueled vehicles or analytical sampling purposes.

OBJECT AND ADVANTAGES

When parallel passage contactor elements are built, they must combine thin adsorbent sheets of high micropore volume capacity with a porous, low pressure drop separator (or no separator at all). The first requirement is introduced by the need to maximize the adsorption capacity of the sheet adsorbent; the second ensures that a low pressure drop device is being obtained. For fast cycle PSA application, the intra-particle diffusion must be minimized, which can be realized by using very small adsorbent particles, preferably in sub-micron size. Based on all these considerations, a means for manufacturing thin sheets of adsorbent materials, which hold very small adsorbent particulates, was deemed highly necessary for further improving the efficiency of PSA systems through rapid cycle technology. Calculations showed that to be useful, the adsorbent sheet must have a sheet thickness less than about 0.8 mm, a void volume fraction in the range of about 0.3 to 0.9, particle sizes smaller than about 0.7 µm, and an linear driving force mass transfer coefficient larger than about 1 $sec^{-1}$. The contactor must withstand the high velocity flow associated with rapid cycling PSA, in conditions where pelletized powders fluidize and suffer from attrition, and woven cloths do not have sufficient stability or structural integrity.

It is therefore an object of this invention to provide an adsorbent material, which immobilizes and incorporates a multitude of fine adsorbent particulates, with characteristic dimensions in the nanometer or micrometer range, which otherwise are too small to be used alone for adsorption applications.

Another object of this invention is to provide an adsorbent material that maintains much of the adsorptive properties of the starting adsorbent particles, thus that one can take full advantage of the high reactivity and fast adsorption or reaction rates associated to small adsorbent particles in the nanometer and micrometer range.

Yet another object of this invention is to provide an adsorbent material configured as a reinforcement-free, self-supported, flexible thin sheet layer or membrane.

Yet one more object of this invention is to teach the use of the above said thin sheet reinforcement-free adsorbent material as an element of parallel passage contactors for adsorption or separation applications in gas or liquid phase.

In this application, "reinforcement" means an essentially freestanding, sizable structure that adds integrity and mechanical stability to a manufactured object, does not necessarily have adsorption properties, and on which one can support with appropriate binders a variety of adsorbent particulates.

In this application, "binder" means a component that, when added in a small amount to a manufactured object, provides structural integrity by gluing together a multitude of component particles, but which does not possess structural integrity by itself, e.g. without the presence of a multitude of particles.

In this application, "self-supporting" means that no rigid backing support is needed for the manufactured object.

In this application, "particles" or "particulates" means solid shapes (not including PTFE) with a diameter from about 0.010 µm to about 100 µm.

One advantage of this invention over prior art consists in the effective immobilization of nanosized adsorbent particulates, in general starting from about 10 nm, for more efficient use in adsorption and separation applications. Also, this invention teaches the manufacturing of a reinforcement-free, self-supported, coherent, and dimensionally stable adsorbent material which can be configured as an element of a parallel passage contactor. An obvious advantage of this material, which comes from the lack of any structural reinforcement, is that its apparent volume is essentially filled with adsorbent particles, thus maximizing the adsorption capacity per volume of adsorbent sheet. Yet, the parallel passage contactors made from material, when used for adsorption or separation applications, combine good mass phase transfer properties with low pressure drop. Another advantage of this invention comes from the fact that the adsorbent material can be obtained as a thin and flexible sheet, which makes it useable in many forms, such as parallel sheets, corrugated sheets, embossed sheets, spiral wound or in a honeycomb configuration, as elements of a parallel passage contactor. Yet a more distinct advantage of this invention is that it provides a means for using small adsorbent particulates, with sizes in the nanometer or micrometer range, in a free-standing, reinforcement-free, dimensionally stable material which becomes suitable for manufacturing parallel passage contactors to be used in rapid cycles pressure swing adsorption.

Further objectives and advantages of this invention will become apparent from a consideration of the following full description of embodiments.

FIGURES

FIG. 1 is a scanning electron microscope picture of the adsorbent sheet material obtained according to the procedure outlined in Example 1. The primary carbon nanoparticles of less than 20 nm are randomly distributed and enmeshed by the polymer fibrils (not seen in the picture). The scale bar length is 100 nm.

FIG. 2 is another scanning electron microscope picture of the adsorbent sheet materials obtained according to the procedure outlined in Example 1. It shows that carbon nanoparticles form an open structure, with very little attachments and contact points to polymer fibrils. A polymer binder fibril about 1000 nm long and less than 40 nm in diameter is also seen. The scale bar length is 200 nm.

FIG. 3 is a scanning electron microscope picture of the adsorbent sheet material obtained according to the procedure outlined in Example 2. It shows a mixture of activated carbon particles of various sizes, forming a reinforcement-free open structure held together by polymer fibrils (not seen in the picture). The scale bar length is 2 µm.

FIG. 4 is a schematic drawing showing a parallel passage contactor element configured as a multitude of flat adsorbent sheets 1 in a parallel arrangement. Air inlet 2 and air outlet 3 are arranged such that the direction of airflow is parallel with the surface of flat sheets.

FIG. 5 is a schematic drawing showing a parallel passage contactor element configured as a spiral structure made from an adsorbent sheet 1. Air inlet 2 and air outlet 3 are arranged such that the direction of airflow is parallel with the surface of adsorbent sheet.

FIG. 6 is a schematic drawing showing a parallel passage contactor element configured as a honeycomb structure consisting of alternating flat sheets 1 and corrugated sheets 4. Air inlet 2 and air outlet 3 are arranged such that the direction of airflow is parallel with the surface of corrugated and flat sheets.

FIG. 7 compares results on $CO_2$ breakthrough from a packed bed of 1 mm granular carbon and a parallel passage contactor element made from a carbon adsorbent sheet manufactured according to Example 2, and configured as a spiral structure according to Example 7.

DETAILED DESCRIPTION OF THE INVENTION

Figure 1:
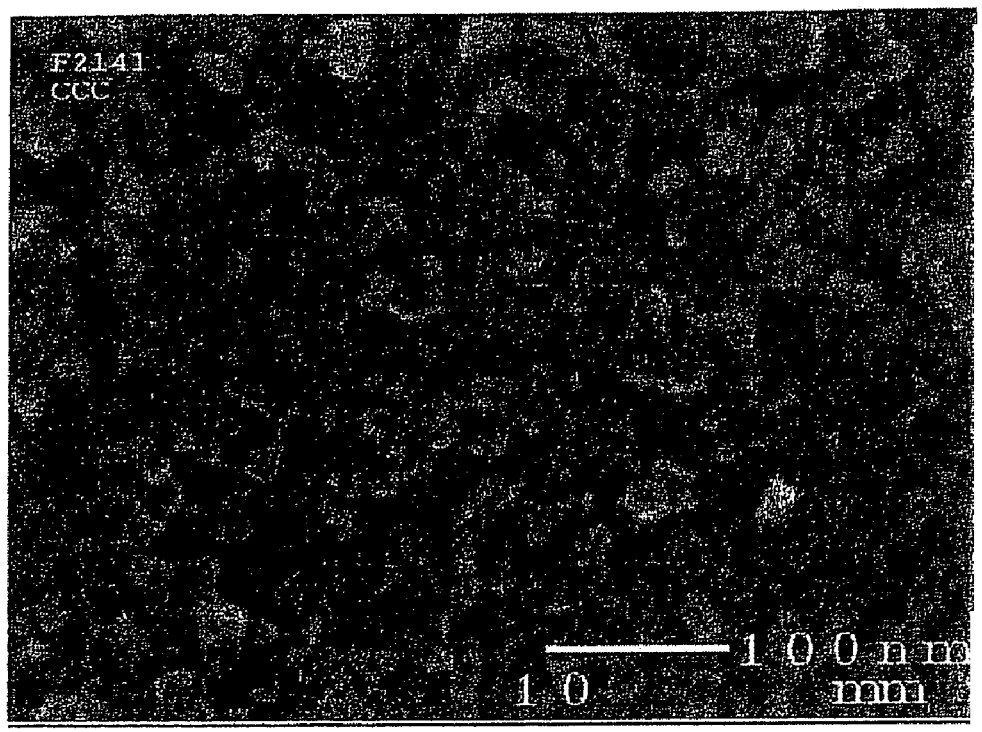

By employing a process like the one disclosed by U.S. Pat. Nos. 4,153,661 and 5,071,610, a sheet material is obtained, containing a first type of adsorbent particulates, either alone or admixed with a second type of adsorbent particulates, or the second type of adsorbent particulates alone, and a polymer binder.

The first type of adsorbent particulates includes but is not limited to carbon nanoparticles and inorganic oxides nanoparticles and is characterized by particle sizes in the range of about 10 to about 200 nm. Examples of carbon nanoparticles include but are not limited to carbon black particles, carbon fullerences, and multiwalled carbon nanotubes. Examples of inorganic oxide nanoparticles include but are not limited to silica, alumina, alumino-silicates (e.g. natural or synthetic zeolites), magnesia, zirconia, titania, ceria.

The second type of adsorbent particulates is comprised of activated carbon, such as particles or fibers, inorganic oxides, ceramic materials, or synthetic polymeric resins with particle sizes in the range from about 0.2 to about 100 µm.

The adsorbent particulates from the first and second group are characterized, in general, by adsorptive properties that make them suitable for use as adsorbents in the parallel passage contactor after incorporation in the sheet form. Although the nature of these adsorbent particulates may vary within quite large limits, the adsorptive properties are expected to correlate with their specific surface area and micropore volume, as measured by nitrogen adsorption. The acceptable limits for specific surface area are between 200 and 2500 $m^2/g$ and the acceptable limits for the micropore volume are between 0.2 and 1 $cm^3/g$. For practical applications where the device footprint or the device volume should be minimized, a more convenient measure of the adsorptive properties is based on the apparent or bulk volume of the adsorbent, which can be contained in the working volume of the adsorption device. Thus, when the bulk density of obtained sheet materials is property accounted for, the adsorption capacity could also be expressed as the total BET surface area or total micropore volume of the adsorbent material per apparent unit volume of the adsorbent material. The corresponding range for sheet surface area to total sheet volume ratio is 200 to 2500 $m^2/cm^3$ and the range for the sheet micropore volume to total sheet volume ratio is 0.1 to 0.9.

Examples of polymer binder include but are not limited to polyethylene, polypropylene, polytetrafluoroethylene (PTFE), polyamide, cellulose acetate, polyvinyldifluoride (PVDF) or any other natural or synthetic polymer that is capable of suspending other particles in a random manner.

The optimal ratio of adsorbent particulates to polymer fibril binder can be varied, but should be kept, in general, in the range from 98:2 to 60:40 by weight. Under these conditions, the composite sheet is obtained with porosity in the range of 30 to 95% void volume, and the mean pore size in the range of 0.002 to 2 µm. Fugitive pore formers such as salts, or excess solvents, or polymers may be added to increase the pore size and porosity.

The obtained sheet material can be formed with sheet thickness in the range from 50 to 1000 µm, but it is convenient for the purpose of the present invention to manufacture it in very thin sheets. When the particulate adsorbent particles are preponderantly in the form of nanoparticles with large surface area to volume ratio it is preferable to manufacture the composite sheet material with small thickness in order to take advantage of the properties of individual nanoparticles.

One important advantage offered by thin sheet nanocomposite is the ability to freely access the particle and interparticle surfaces, which thus can efficiently be used for gas or vapor adsorption, pathogen annihilation, surface chemical reactions, or electrochemical energy storage, to name a few.

EXAMPLE 1

Figure 2:
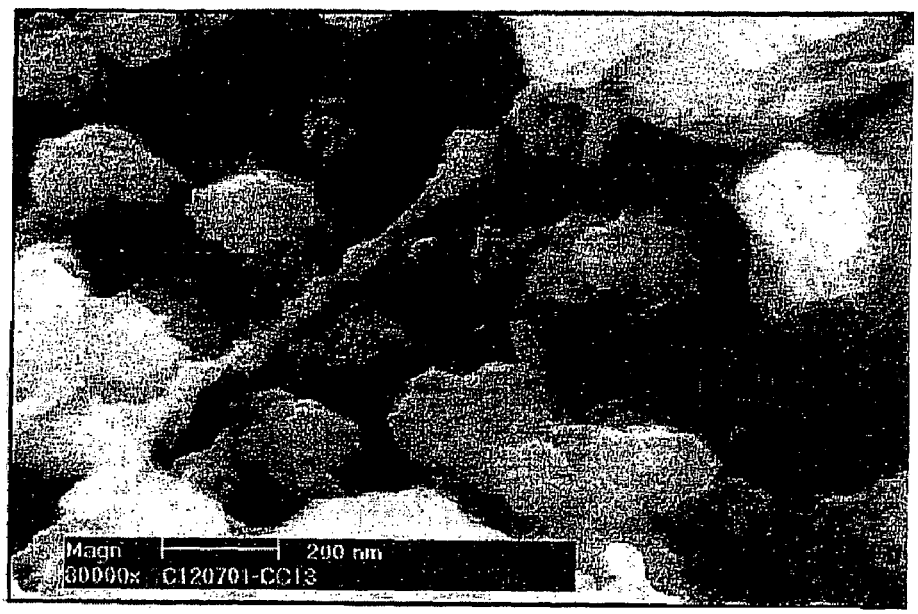

This example demonstrates that processing the nanoparticulate carbon black in a sheet form does not substantially reduce the surface area and mesopore volume of the starting carbon black material. According to one of preferred embodiments, a nanoparticulate carbon sheet containing 85% furnace carbon black (such as Black Pearls 2000 available from Cabot Corporation) and 15% PTFE (available commercially as Teflon 30 or Teflon 601A) was obtained by blending the particulate adsorbent material with PTFE in the presence of water, followed by intensive mixing to cause PTFE fibrillation, biaxial calendaring to form the sheet, and drying. A carbon sheet with thickness of 250 µm was obtained. FIG. 1 shows a SEM (scanning electron microscopy) image of the obtained material; carbon black nanoparticles with sizes in the 20–50 nm range are visible. A polymer fibril about 1000 nm long and 20 nm in diameter is seen in FIG. 2. The carbon nanoparticles bound around and between polymer fibrils form an open, essentially reinforcement-free structure. The carbon black used in this example had a surface area of 1500 $m^2/g$, and a total pore volume of 1.65 $cm^3/g$ distributed mostly (54%) in the mesopores (2–50 nm), see Table 1. The resulted nanoparticulate carbon black sheet had a total surface area of 1200 $m^2/g$ and a total pore volume of 1.55 $cm^3/g$, from which more than 70% is distributed in the mesopores, (see Table 1). The BET surface area was calculated from nitrogen adsorption data at liquid nitrogen temperature, and the pore volume distribution was calculated using the DFT method (as developed by Micromeritics) and nitrogen adsorption data. While the average particle size of the starting carbon black was approximately 12–15 nm, it is estimated that pore sizes of greater than 50–100 nm exist in the obtained carbon sheet, as pores between complex strands and agglomerates of particles (see FIG. 1). The material was tested for static VOC adsorption capacity (see Example 3).

TABLE 1

Surface area and pore volume distribution of starting particulate materials and sheet processed carbon materials

| | Carbon black (BP 2000) | Carbon black sheet | Activated carbon (MSP 20) | Activated carbon sheet |
|---|---|---|---|---|
| BET surface area ($m^2/g$) | 1500 | 1200 | 2400 | 1900 |
| Total pore volume (< 120 nm) ($cm^3/g$) | 1.65 | 1.55 | 0.88 | 0.83 |
| Ultra micropores (<1.18 nm) ($cm^3/g$) | 0.19 | 0.15 | 0.45 | 0.33 |
| Super micropores (1.18–2 nm) ($cm^3/g$) | 0.13 | 0.14 | 0.33 | 0.26 |
| Total micropores (<2 nm) ($cm^3/g$) | 0.32 | 0.29 | 0.78 | 0.59 |
| Micropores fraction (%) | 19.39 | 18.71 | 88.64 | 71.08 |
| Mesopores (2–50 nm) ($cm^3/g$) | 0.89 | 1.11 | 0.07 | 0.12 |
| Mesopore fraction (%) | 53.94 | 71.61 | 7.95 | 14.46 |

EXAMPLE 2

Figure 3:
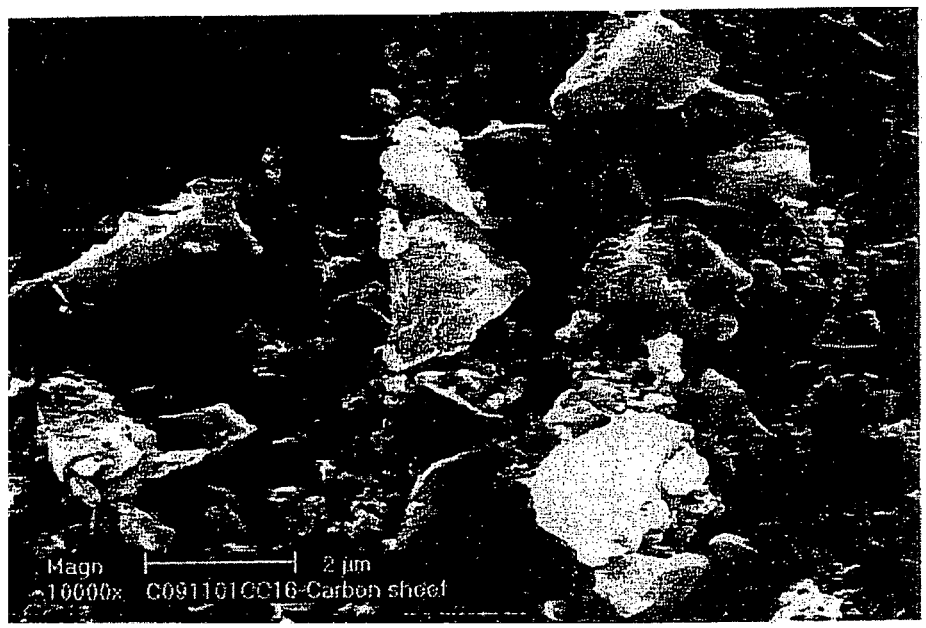

This example demonstrates that processing high surface area activated carbon particles in a sheet form does not substantially reduce the surface area and micropore volume of the starting activated carbon material. According to another embodiment, a carbon sheet containing 80% activated carbon particles (such as MSP20 activated carbon available from Kansai Coke & Chemical Company), 10% carbon black (such as Black Pearls 2000 available from Cabot Corporation) and 10% PTFE (available commercially as Teflon 30 or Teflon 601A) was prepared according to the procedure from Example 1. A carbon sheet with thickness of 200 µm was obtained. FIG. 3 shows a SEM (scanning electron microscopy) image of the obtained material; carbon particles of various sizes and irregular shape form an open, reinforcement-free structure. The BET surface area and the pore volume distribution were calculated as explained in Example 1. The initial activated carbon was characterized by a BET surface area of 2400 $m^2/g$ and a total pore volume of 0.88 $cm^3/g$, of which 88% was comprised in micropores (below 2 nm), see Table 1. The resulted activated carbon sheet material was characterized by a surface area of 1900 $m^2/g$ and a total pore volume of 0.83 $cm^3/g$, of which 71% was comprised in micropores (below 2 nm) and 15% in mesopores (2–50 nm), see Table 1. The material was tested for static VOC adsorption capacity (see Example 4) and $CO_2$ adsorption capacity and kinetics (see Example 5).

EXAMPLE 3

This example demonstrates that processing carbon black material in sheet form does not significantly reduce the static VOC adsorption capacity of starting carbon black. Static adsorption of volatile organic compounds (VOC) was measured on the starting carbon black material (Black Pearls 2000) and on the derived carbon sheet material from Example 1. The samples (0.3–0.5 g) were dried at 180 C., and accurately weighed in capped glass bottles. The capped bottles were placed in desiccators containing a beaker with a few milliliters of liquid VOC (either one of toluene, carbon tetrachloride, and trimethylpentane). The lids of the desiccators were tightly closed and the bottles were uncapped. The adsorbent samples were allowed to equilibrate with the respective VOC vapors for 3 hours at room temperature. After 3 hours, the bottles were capped, removed from desiccators and accurately weighed. The weight gain represents the amount of VOC adsorbed plus the weight of saturated vapors trapped inside the capped bottles. In order to correct for the weight of saturated vapors, the adsorbent samples were replaced in the desiccators, uncapped, and the desiccator's lids were partially open to the ambient. After one more hour, the bottles were re-capped, removed from the desiccators and weighed. The weight gain versus the initial weight of dried samples represents the capacity for static VOC adsorption at the pressure of saturated vapors of respective VOC, at room temperature. The results are shown in Table 2. It is seen that the static VOC capacity of carbon sheet materials derived from carbon black are within 80–95% if the VOC capacity of the starting carbon black material.

EXAMPLE 5

This example demonstrates that the activated carbon sheet material is characterized by faster adsorption kinetics and higher adsorption capacity for $CO_2$ adsorption in comparison with granular activated carbon and activated carbon fibers. A carbon sheet material was obtained as shown in Example 2. The adsorption of $CO_2$ at room temperature was measured by the volumetric method, in which the adsorption is monitored through pressure variations following successive gas dose introductions in a close, calibrated volume. The activated carbon sheet material of Example 2 was tested against a 12×30 mesh granular activated carbon (GAC) sample obtained from coconut shell (bulk density 0.4 g/cm$^3$) and an activated carbon fiber (ACF) cloth (bulk density 0.2 g/cm$^3$). The results are shown in Table 4. It is seen that the activated carbon sheet obtained according to Example 2 is characterized by a substantially higher isothermal adsorption capacity for $CO_2$, on a weight basis and on a volumetric basis, as well as by a faster mass transfer coefficient. The increased capacity, coupled with the faster mass transfer coefficient, demonstrates the advantage of using activated carbon sheet materials as components of parallel passage contactors for rapid cycle pressure swing adsorption systems. The improvement over GAC and ACF cloth comes from the open access of gas to sub-micrometer sized carbon particles immobilized in the sheet form, according to the present invention disclosure.

TABLE 2

Static VOC adsorption data on carbon black and carbon black derived sheet materials

| | Toluene | | Carbon tetrachloride | | Trimethylpentane | |
|---|---|---|---|---|---|---|
| | Carbon black BP2000 | Adsorbent Carbon Sheet | Carbon black BP2000 | Adsorbent Carbon Sheet | Carbon black BP2000 | Adsorbent Carbon Sheet |
| Weight of initial sample (g) | 0.3914 | 0.4241 | 0.3704 | 0.4650 | 0.3733 | 0.3868 |
| Weight of dried sample (g) | 0.3823 | 0.4117 | 0.3616 | 0.4541 | 0.3642 | 0.3753 |
| Weight of sample after adsorption (g) | 0.7614 | 0.8058 | 0.7362 | 0.8527 | 0.6198 | 0.5839 |
| Amount adsorbed (%) | 99.16 | 95.73 | 103.60 | 87.78 | 70.18 | 55.58 |

EXAMPLE 4

This example demonstrates that processing the material in sheet form does not significantly reduce the static VOC adsorption capacity of activated carbon material. Static adsorption of volatile organic compounds (VOC) was measured on the starting activated carbon material (MSP 20) and on the derived activated carbon sheet material from Example 2. The procedure was similar to that from Example 3. The results are shown in Table 3. It is seen that the static VOC capacity of activated carbon sheet materials derived from activated carbon materials are within 85–90% if the VOC capacity of the starting activated carbon material.

TABLE 3

Static VOC adsorption data on activated carbon and activated carbon derived sheet materials

| | Toluene | | Carbon tetrachloride | | Trimethylpentane | |
|---|---|---|---|---|---|---|
| | Activated Carbon MSP 25 | MSP-20 Adsorbent Carbon Sheet | Activated Carbon MSP 25 | MSP-20 Adsorbent Carbon Sheet | Activated Carbon MSP 25 | MSP-20 Adsorbent Carbon Sheet |
| Weight of initial sample (g) | 0.3911 | 0.5698 | 0.3911 | 0.5698 | 0.3375 | 0.5699 |
| Weight of dried sample (g) | 0.2413 | 0.5350 | 0.3905 | 0.5515 | 0.3371 | 0.5514 |
| Weight of sample after adsorption (g) | 0.4227 | 0.8907 | 0.9050 | 1.1630 | 0.5356 | 0.8299 |
| Amount adsorbed (%) | 75.18 | 66.49 | 131.75 | 110.88 | 58.88 | 50.51 |

TABLE 4

Isothermal capacity and kinetic constant of $CO_2$ adsorption on activated carbon adsorbent sheet and other forms of adsorbent carbon for reference

|  | MSP-20 Adsorbent Carbon Sheet | Coconut Shell Granular Carbon (12 × 30 mesh) | Activated Carbon Fiber Cloth |
|---|---|---|---|
| Isothermal $CO_2$ working capacity @ 30 C. (0.5 to 5 atm) (mmole/g) | 5.9 | 4.1 | 4.7 |
| Isothermal $CO_2$ volumetric capacity @ 30 C. (0.5 to 5 atm) (mmole/cm$^3$) | 2.54 | 1.64 | 0.94 |
| Mass transfer coefficient of $CO_2$ uptake (sec$^{-1}$) | 1.4 | 0.7 | 1.4 |

EXAMPLE 6

Figure 4:
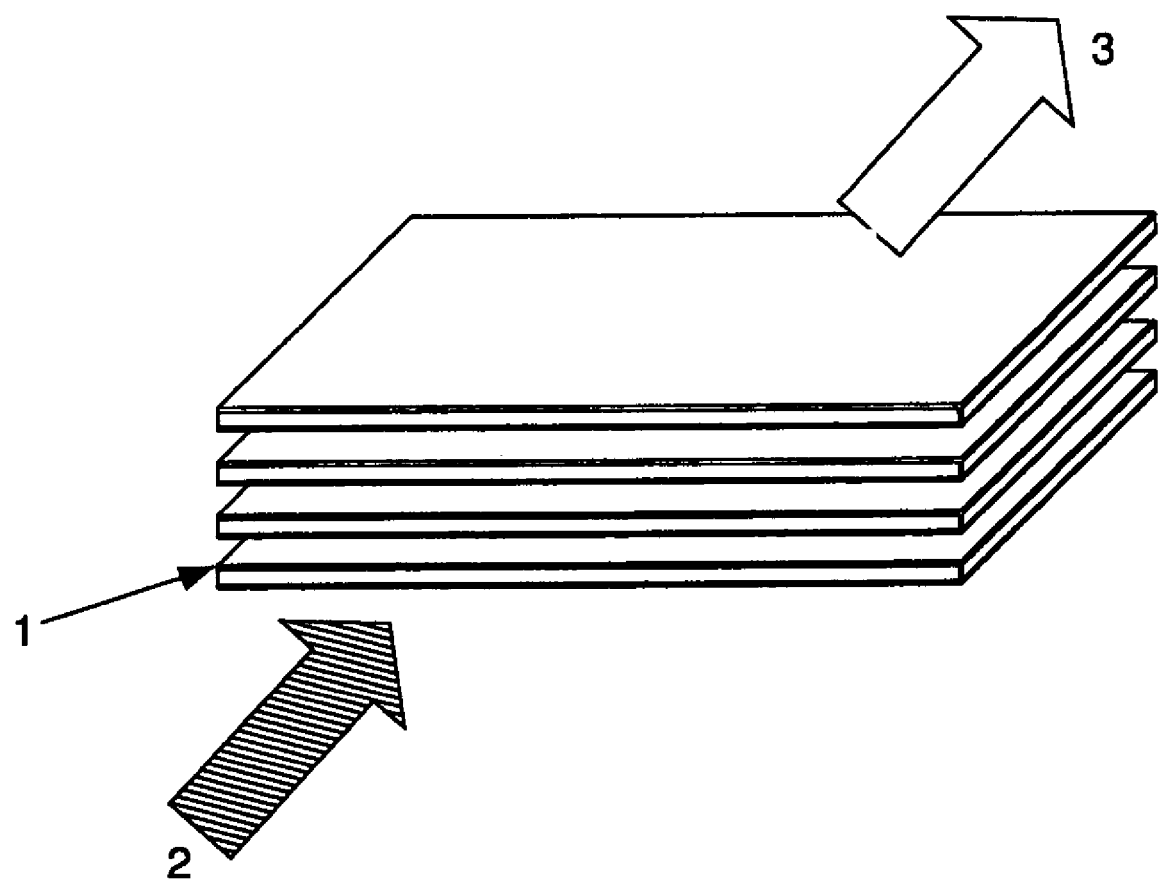

This example shows the making of a parallel passage contactor with flat sheets configuration. Reference is made to FIG. 4. The adsorbent material obtained as disclosed in this invention was manufactured as a multitude of flat sheets 1 stacked together with gaps between adjacent sheets to allow the flow of gas parallel to the sheet surface from the direction of gas inlet 2 to gas outlet 3. A separator material was used between adjacent layers of carbon sheet. In this example the separator was a 230 µm thick polypropylene mesh.

EXAMPLE 7

Figure 5:
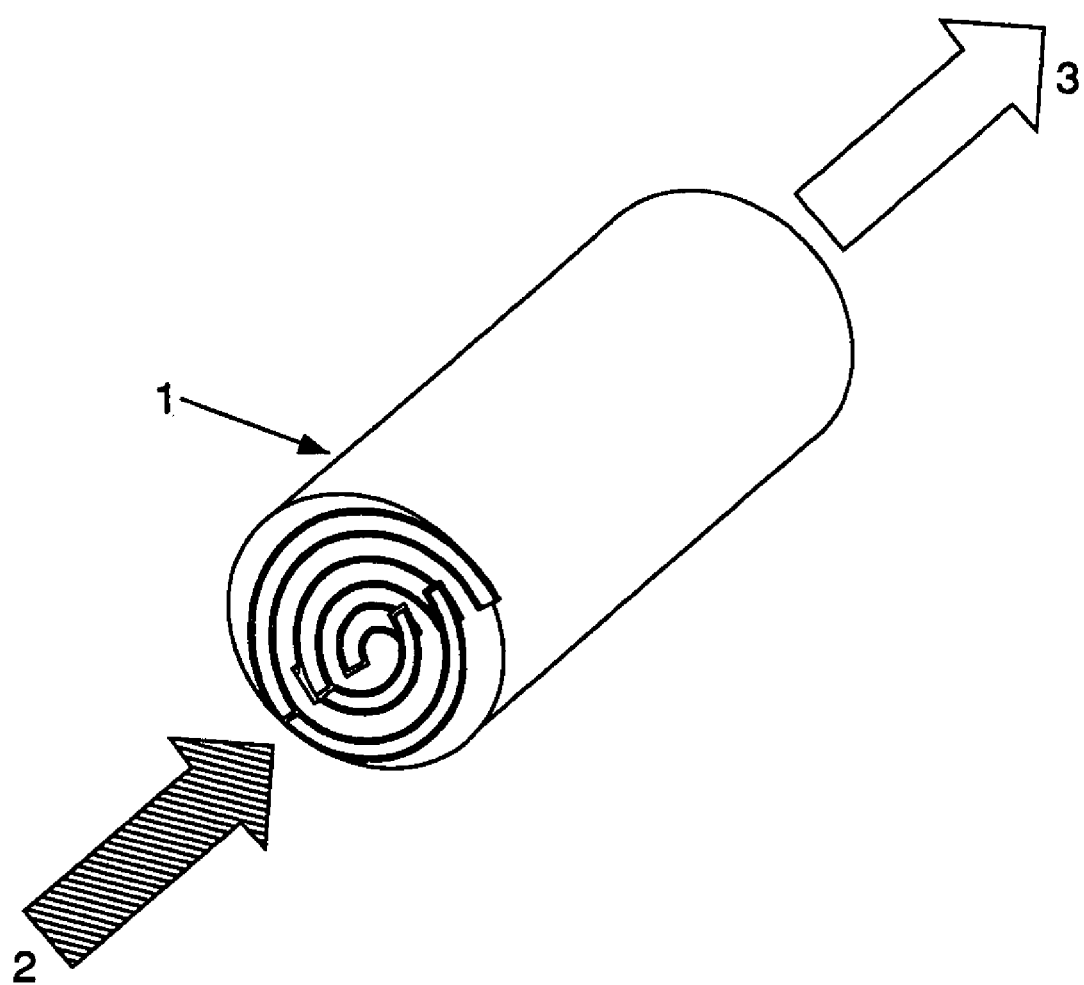

This example shows the making of a parallel passage contactor with spiral configuration. Reference is made to FIG. 5. The adsorbent material obtained as disclosed in Example 2 of this invention was manufactured as a long and continuous sheet 1 which was then rolled into a spiral with gaps between adjacent layers. The gas was allowed to flow parallel to the sheet surface from the direction of gas inlet 2 to gas outlet 3. A separator material was used between adjacent layers of carbon sheets. In this example the separator was a 230 µm thick polypropylene mesh. The parallel passage contactor was tested for $CO_2/N_2$ separation (see Example 9).

EXAMPLE 8

Figure 6:
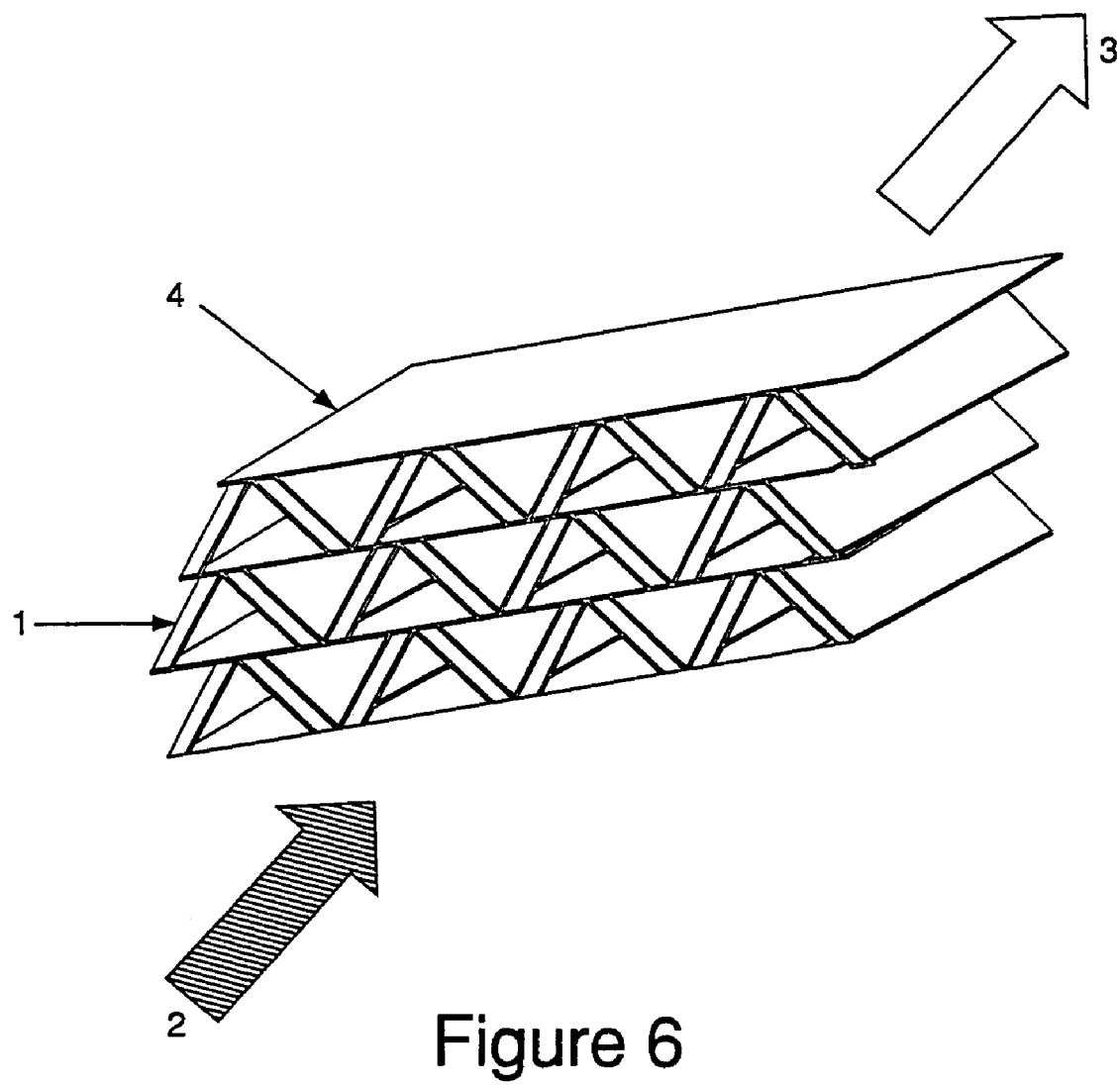

This example shows the making of a parallel passage contactor with honeycomb configuration. Reference is made to FIG. 6. The adsorbent material obtained as disclosed in this invention was manufactured as a multitude of corrugated sheets 1 and flat sheets 4. A multitude of alternating corrugated and flat sheets was assembled as shown in FIG. 6. The gas would be allowed to flow parallel to the sheet surface from the direction of gas inlet 2 to gas outlet 3.

EXAMPLE 9

This example demonstrates the performance of adsorbent materials manufactured according to the methods disclosed in Examples 1 and 2 when assembled as parallel passage contactors. Various activated carbon powders (such as MSP 20 from Kansai Coke & Chemicals Company; WPH from Calgon Carbon Corporation; and Picactif PCO from Pica USA), together with carbon black nanoparticles (Black Pearls 2000 from Cabott Corporation), were selected as raw materials for manufacturing adsorbent sheet materials according to the general procedures described in Examples 1 and 2. The properties of the obtained adsorbent sheet materials are outlined in Table 5. The manufactured materials were spiral wound around a central rod (0.63 cm diameter) to form parallel passage contactors as described in Example 7. The separator between adjacent adsorbent layers was a 230 µm thick polypropylene mesh. The typical length of the spiral wound rolls was 10.2 cm and the outer diameter was 2.22 cm. The resulted rolls were inserted in cylindrical canisters, which were connected to the gas line. In this configuration, the gas flow direction is parallel to the carbon adsorbent surface, as shown schematically in FIG. 5.

TABLE 5

Properties of adsorbent carbon sheet materials made with carbon particulates from various sources

| Activated carbon source | Carbon precursor | Thickness (mm) | Bulk density (g/cm$^3$) | Areal weight (m$^2$/g) | BET surface area (m$^2$/g) | Micropore volume (cm$^3$/g) | Total pore volume (cm$^3$/g) |
|---|---|---|---|---|---|---|---|
| Cabott Corp. BP2000 | Furnace carbon black | 0.29 | 0.369 | 107 | 1200 | 0.257 | 1.60 |
| Kansai coke Maxsorb MSP20 | Phenolic resin | 0.20 | 0.525 | 105 | 1870 | 0.687 | 1.03 |
| Calgon Carbon WPH | Bituminous coal | 0.22 | 0.673 | 145 | 685 | 0.289 | 0.683 |
| Picactif PCO | Coconut shell | 0.33 | 0.596 | 197 | 907 | 0.404 | 0.606 |

Pressure drop tests were performed for each cartridge using nitrogen, with the outlet at atmospheric pressure. The flow rate was increased to a maximum of 4.5 L/min and the pressure drop across the canisters was measured using a differential pressure transducer. The permeability of canisters was calculated from the following equation:

$$\beta = \frac{\mu Q l}{A \Delta P}$$

where Q (cm³/min) is the flow rate, $l$ (cm) is the length, and A (cm²) is the cross section of parallel passage contactors, ΔP (Torr) is the pressure drop, and μ=1.83×10⁻⁵ Pa·s is the gas viscosity. The permeability values expressed in Darcy units (1 Darcy=0.987×$^{10}$⁻10 Pa·s) are given in Table 6. The higher the permeability, the lower the pressure drop across canister at equal volume flow rates.

Breakthrough tests were measured with 1% $CO_2$ in nitrogen, at atmospheric pressure and room temperature. The canisters were purged several hours with pure nitrogen before each test. The tests consisted in injecting a step of 1% $CO_2$ concentration in the nitrogen feed, and recording the gas composition at the outlet of the contactor. The gas composition in the feed was adjusted by varying the volume flow of nitrogen (between 1500 and 4500 Ncm³/min) and carbon dioxide (between 5 and 60 Ncm³/min). The gas composition downstream the contactor was analyzed using a Stanford Research Systems residual gas analyzer model RGA-100. The gas was continuously sampled from the discharge flow and directed into the analyzer via a 0.76 mm capillary and a differential pumping system. The sampling rate of the mass spectrometer was 2 seconds. The breakthrough profiles were analyzed according to the model developed by Yoon and Nelson (Am. Ind. Hygiene Assoc. J., 45 (8), 509, 517 (1984)) based on gas adsorption kinetics in a bed of solid sorbent. The main equation of the Yoon-Nelson model is:

$$\frac{C_{out}}{C_{in}} = \{1 + \exp[-k'(t - \tau)]\}^{-1}$$

It relates the concentration of contaminant that enters ($C_{in}$) or escapes ($C_{out}$) the contactor with τ, the time at 50% breakthrough, and k', an apparent kinetic constant that indicates the slope of the breakthrough curves. With τ and k' measured from experimental data, an intrinsic kinetic constant k (independent on flow rate and concentration conditions) and an equilibrium adsorption capacity $W_e$ (at the corresponding gas concentration) can be calculated:

$$k' = k \frac{C_{in} Q}{W_e} = \frac{k}{\tau}$$

The calculated values are given in Table 6. Large k values indicate fast mass transfer kinetics.

The separation efficiency of each contactor was evaluated from the number of theoretical plates, N, calculated as the ratio of the total column length to the height equivalent to a theoretical plate ($L_{HETP}$). The $L_{HETP}$ values were calculated following the theoretical analysis of Ruthven and Thaeron (Gas. Sep. Purif. 10, 63 (1996)) from the first and second moments of the experimental breakthrough curves:

$$L_{HETP} = \frac{\sigma^2}{\mu^2}$$

where μ and σ are defined as follows in case of a step concentration variation:

$$\mu = \tau = \int_0^\infty \left(1 - \frac{C_{out}}{C_{in}}\right) dt$$

$$\sigma^2 = \int_0^\infty 2\left(1 - \frac{C_{ouy}}{C_{in}}\right) t dt - \mu^2$$

Examples of calculated values are given in Table 6. The smaller the $L_{HETP}$ value, the higher the separation efficiency of the parallel passage contactor.

The energy efficiency of the contactors was calculated in terms of pressure drop per theoretical stage, $\Delta P_{HETP}/L_{HETP}$, as suggested in the above cited reference by Ruthven and Thaeron. For this calculation we used the experimental permeability values (β) of each canister:

$$\frac{\Delta P_{HETP}}{L_{HETP}} = \frac{v}{\beta}$$

where v is the linear velocity. Examples of calculated values are given in Table 6. The smaller the ($\Delta P_{HETP}/L_{HETP}$) value, the lower is the energy penalty for circulating the gas through the parallel passage contactor.

TABLE 6

Performance of various adsorbent sheet materials when assembled in parallel passage contactors for $CO_2/N_2$ separation

| Example | Activated carbon source | Carbon packing density (g carbon / cm³) | Contactor permeability (Darcy) | Intrinsic kinetic constant | Capacity @ 7.6 Torr $CO_2$ (mmol/cm³) | $L_{HETP}$ @ 4.5 L/min (cm) | $\Delta P_{HETP}/L_{HETP}$ (mTorr/cm) |
|---|---|---|---|---|---|---|---|
| 9 | Granular 1 mm activated carbon | 0.56 | 1645 | 2.82 | 0.038 | 3.71 | 1.6 |
| 9 | Cabott Corp. BP2000 | 0.22 | 234 | 10.07 | 0.016 | 2.95 | 12.5 |

TABLE 6-continued

Performance of various adsorbent sheet materials when assembled in parallel passage contactors for $CO_2/N_2$ separation

| Example | Activated carbon source | Carbon packing density (g carbon / cm³) | Contactor permeability (Darcy) | Intrinsic kinetic constant | Capacity @ 7.6 Torr $CO_2$ (mmol/cm³) | $L_{HETP}$ @ 4.5 L/min (cm) | $\Delta P_{HETP}/L_{HETP}$ (mTorr/cm) |
|---|---|---|---|---|---|---|---|
| 9 | Kansai Coke Maxsorb MSP20 | 0.35 | 160 | 8.39 | 0.030 | 1.68 | 18.3 |
| 9 | Calgon Carbon WPH | 0.41 | 213 | 11.33 | 0.029 | 1.57 | 13.8 |
| 9 | Picactif PCO | 0.42 | 211 | 11.81 | 0.037 | 1.37 | 13.9 |
| 10 | Kansai Coke Maxsorb MSP20 (no spacer) | 0.32 | 794 | 7.67 | 0.028 | 1.63 | 3.9 |

The results in Table 6 show that, with one exception, all canisters have almost constant adsorption capacity for $CO_2$ at 7.6 Torr $CO_2$ in gas phase. This is a consequence of the intrinsic adsorption properties of various carbon materials and of the packing densities that can be achieved with them.

Figure 7:
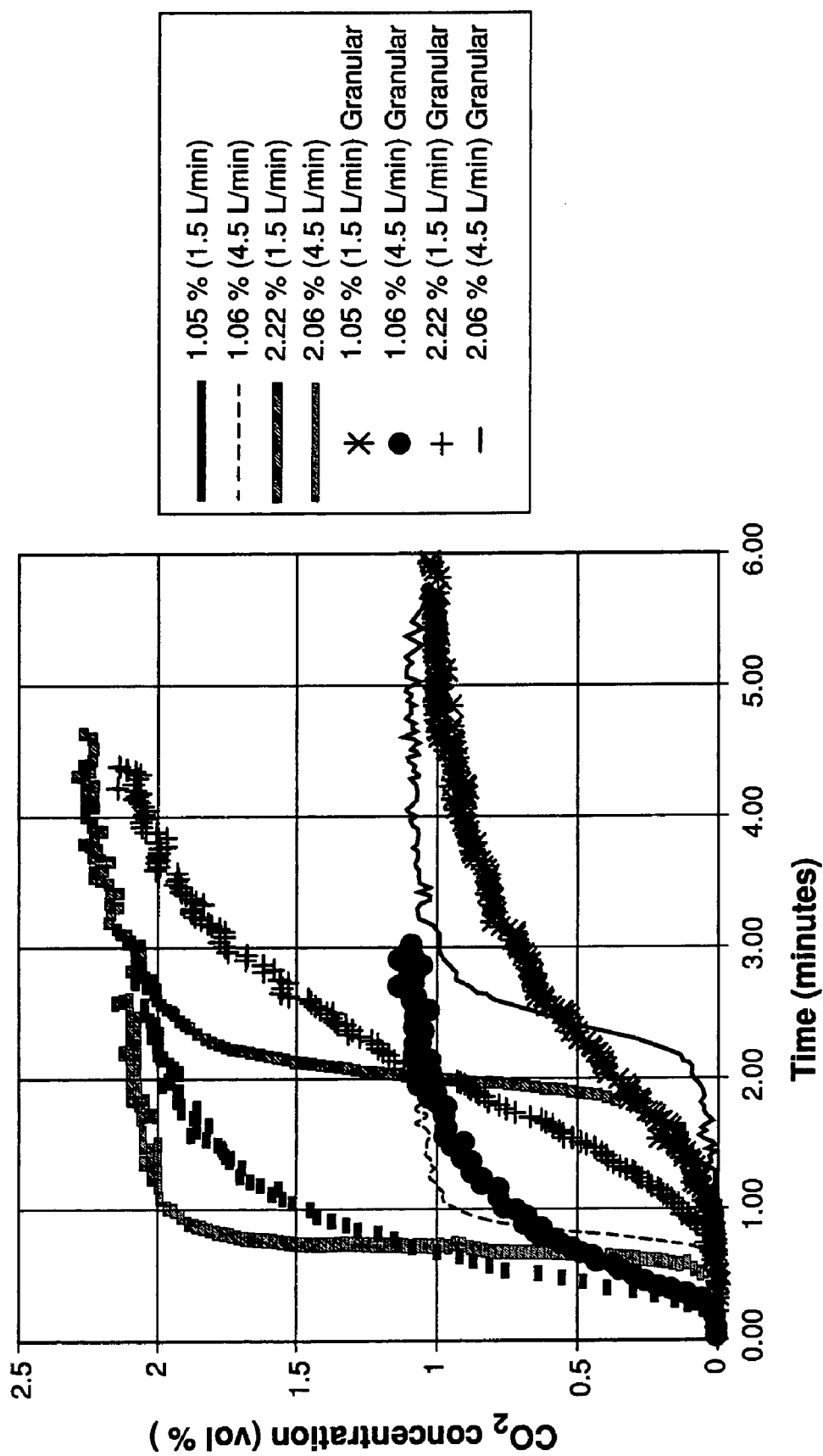
Figure 8:
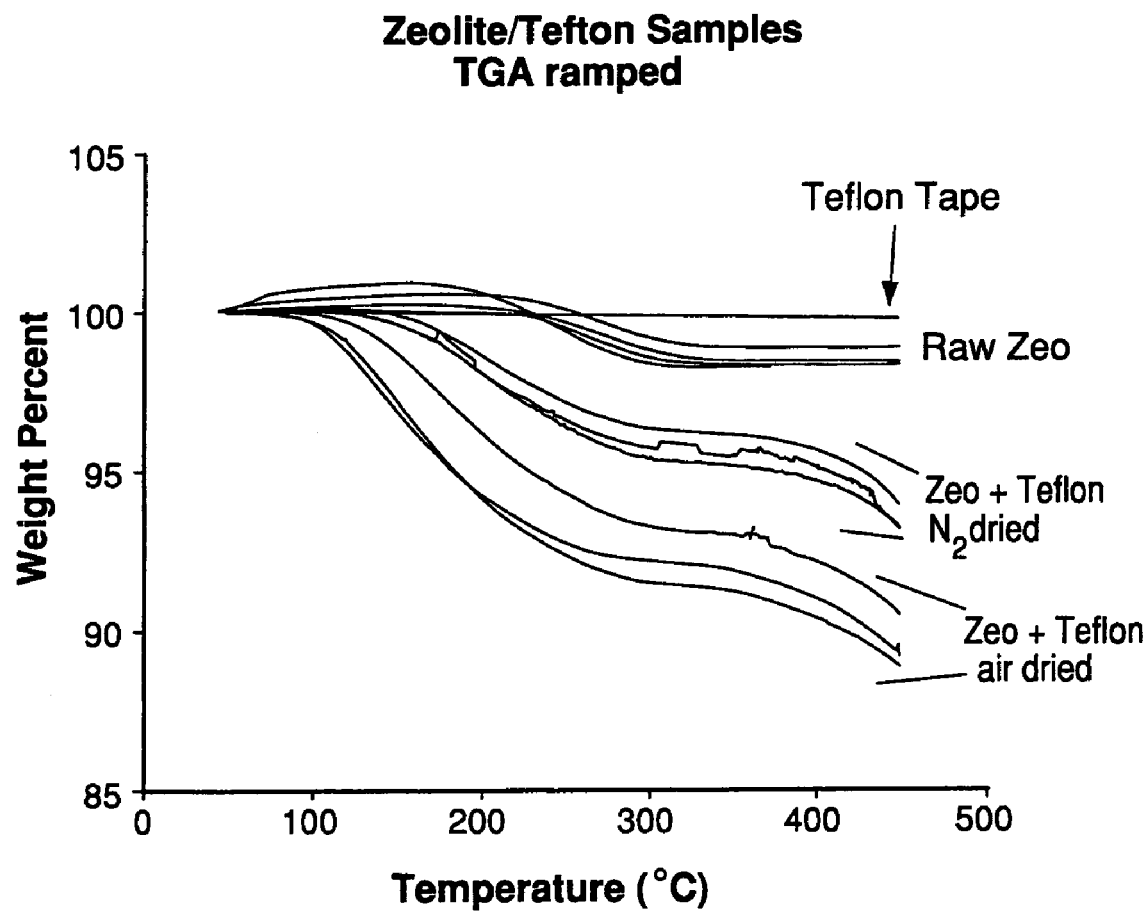
FIG. 8 shows thermogravimetric data on raw Na—X zeolite powder and two samples of zeolite powder processed in sheet form according to the procedure outlined in Example 10. It shows that domains of thermal stability for zeolite sheet samples are between 300 and 400 C.

A comparison of $CO_2$ breakthrough curves from 1 vol % and 2 vol % $CO_2$ in $N_2$ at several flow conditions is shown in FIG. 7 for equal volume canisters containing a bed of 1 mm granular activated carbon and a parallel passage contactor structure made from Kansai Coke Maxsorb MSP 20 activated carbon, according to this Example. Both canisters have almost equal capacity for $CO_2$, but the breakthrough profile is much sharper for the parallel passage contactor made according to this invention. Similar results were found for all contactors made with adsorbent material sheets. Data in Table 6 show that they all have faster adsorption kinetics (higher intrinsic kinetic constant values) than the 1 mm granular activated carbon. This allows for using the PSA system at shorter cycle times when the contactors are made with carbon sheet materials. The sheet materials also show improved separation performance over granular carbon, as indicated by shorter HETP lengths in Table 6. However, the permeability of packed granular beds is higher than that of contactors made from spiral wound adsorbent layers plus separator mesh structures. As a result, the pressure drop per theoretical plate is lower for the granular carbon bed. In conclusion, at comparable adsorption capacity for $CO_2$, the contactors made with adsorbent sheet materials afford faster kinetics (shorter cycle times) and better separation (require shorter column length), at the expense of higher pressure drop.

EXAMPLE 10

This Example shows the making of a parallel passage contactor with spiral configuration and without using a separator between adjacent layers of carbon adsorbent sheets. A 400 μm thick carbon adsorbent sheet containing 80 wt % MSP 20 from Kansai Coke & Chemicals Company, 10 wt % Black Pearls 2000 from Cabott Corporation and 10 wt % PTFE binder was manufactured according to Example 2. The carbon sheet was then aligned parallel to a 200 μm thick stainless steel perforated plate containing a pattern of alternating circular holes of 500 μm diameter separated by distances no shorter than 2 mm. The carbon layer and the patterned perforated plate were passed together between the rolls of a calender. As a result, the carbon sheet acquired a regular pattern of imprinted bosses, with heights of about 100 μm, and the overall thickness of the carbon layer, including the elevated bosses, became 300 μm. This carbon layer was then spiral wound around a central rod (0.63 cm diameter) to form parallel passage contactors as described in Example 7, with the difference that a polypropylene spacer was not used. The results of $CO_2$ breakthrough data analysis are shown in Table 6. In comparison with all other parallel passage contactors containing a polypropylene mesh spacer, the embossed structure without spacer demonstrates higher gas permeability at comparable carbon packing density, $CO_2$ adsorption capacity, and intrinsic kinetic constant values. As a result of all these factors, the separation efficiency was higher and the energy penalty (expressed as pressure drop per theoretical plate) was lower than for all other contactors made with an inert separator mesh.

Examples 11–13 show that processing zeolite in a sheet form does not substantially reduce the $N_2$ adsorption properties of the raw zeolite powder.

EXAMPLE 11

A zeolite sheet material contained 90% zeolite 13X in Na form and 10% PTFE was obtained by blending 100 g of raw Na—X zeolite powder with 16.6 g of Teflon T30 in presence of water, followed by intensive mixing to cause PTFE fibrillation, biaxial calendaring to form the sheet, and drying. The sheets (0.25 mm thick) were air dried overnight at room temperature and for 3 more hours in air at 125 C.

EXAMPLE 12

A zeolite sheet material contained 90% zeolite 13X in Na form and 10% PTFE was obtained as described in Example 11, except that water was replaced by white gas. The sheets (0.25 mm thick) were dried for 3 hours in nitrogen at 125 C.

EXAMPLE 13

Figure 9A:
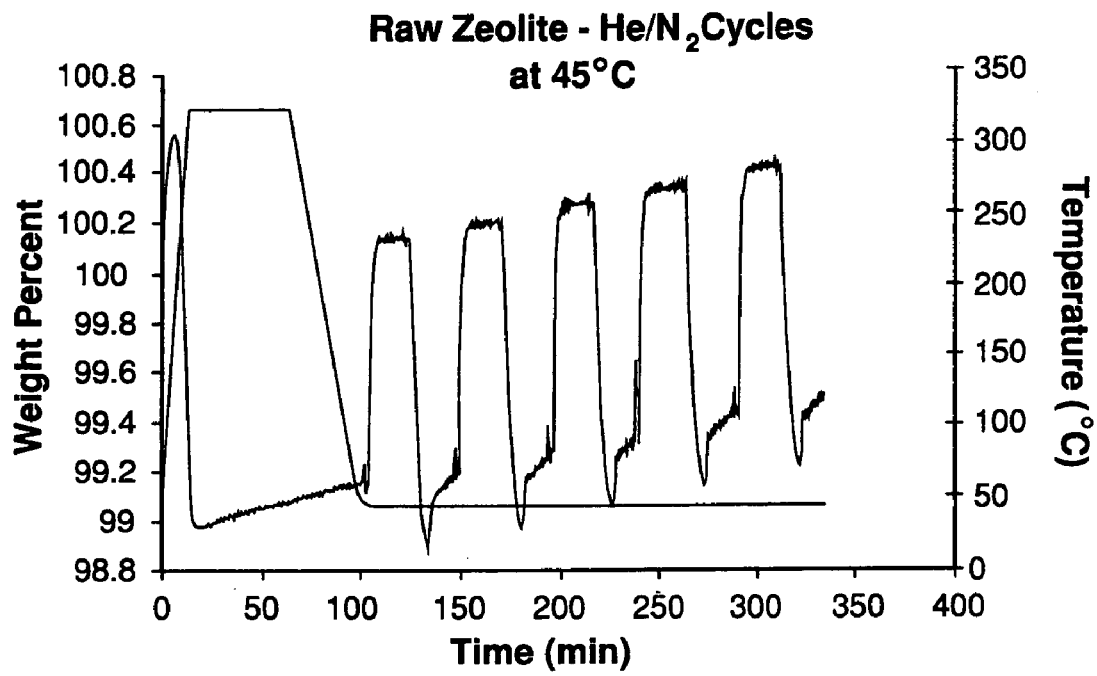
FIG. 9 shows results on drying at 350 C. followed by $N_2$ adsorption/desorption cycles at 45 C. on raw Na—X zeolite powder.
Figure 9B:
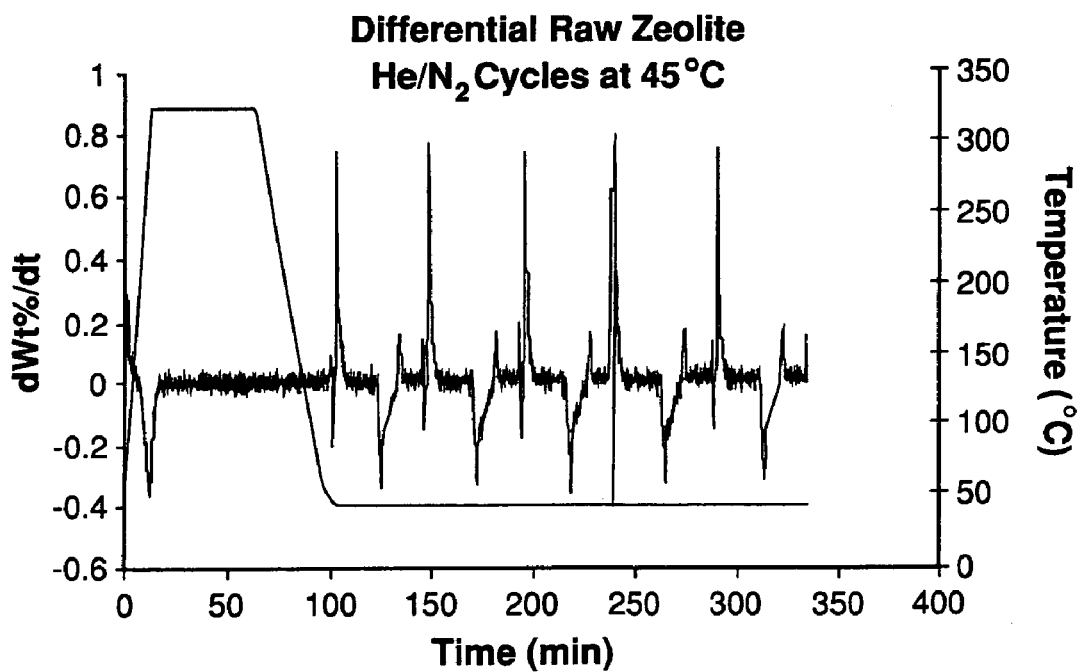

The zeolite containing sheet materials from Examples 11 and 12 were subsequently heat treated at higher temperatures in a TGA apparatus under a He stream. For comparison, the raw Na—X zeolite powder was treated in the same way. The results are shown in FIG. 9. All samples eliminate water between about 100 and about 250 C. The water content is about 1 wt % for raw zeolite powder and between 5–8 wt % for sheet zeolite materials. The dried zeolite powder is stable above 400 C., while the PTFE component of the sheet zeolite materials from Examples 11 and 12 starts to decompose above a temperature of about 400 C.

Figure 10:
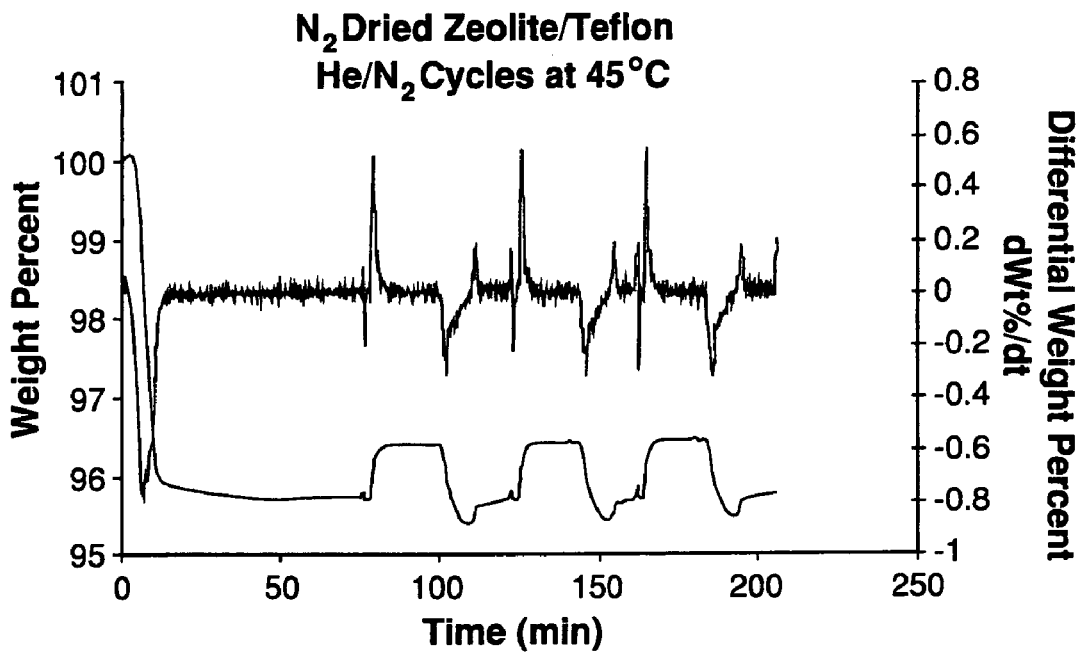
FIG. 10 shows results on drying at 350 C. followed by $N_2$ adsorption/desorption cycles at 45 C. of zeolite processed in sheet form according to the procedure outlined in Example 11.
Figure 11:
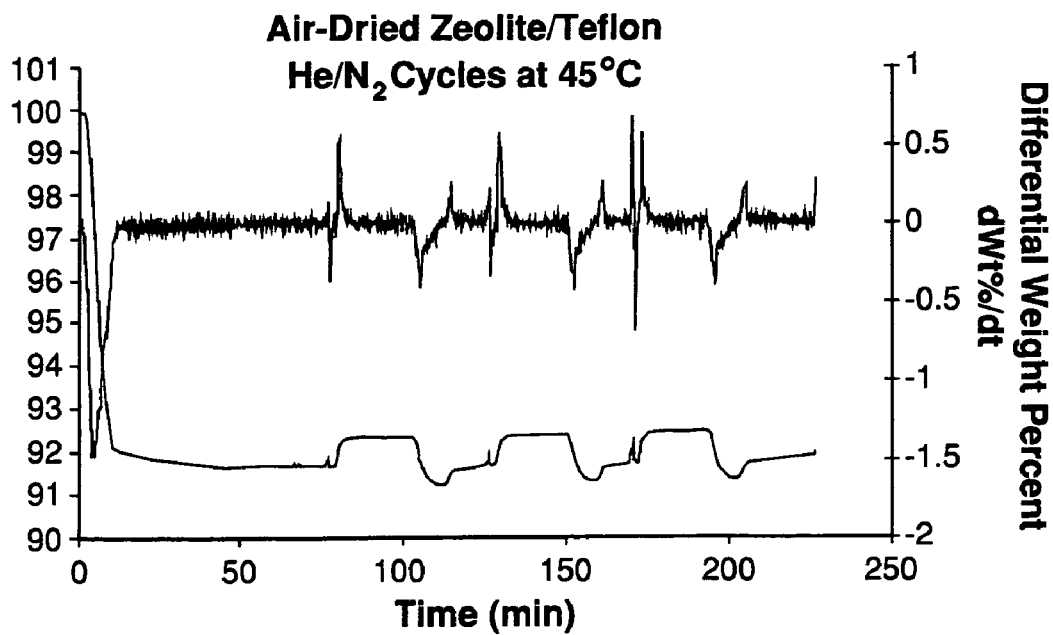
FIG. 11 shows results on drying at 350 C. followed by $N_2$ adsorption/desorption cycles at 45 C. of zeolite processed in sheet form according to the procedure outlined in Example 11.

Based on this result, drying of raw zeolite powder and sheet formed materials was carried out at 340 C. under a He stream in a microbalance. After drying, the temperature was reduced to 45 C. and He gas was replaced by $N_2$. A sudden weight increase was seen with all samples. The weight uptake represents the amount of $N_2$ adsorbed, and the derivative of the weight change is a measure of instantaneous rate of adsorption. The data are shown in FIG. 9 for the raw Na—X zeolite and in FIGS. 10 and 11 for zeolite sheets made according to procedures from Examples 11 and 12, respectively. For all samples, the cycles of adsorption and desorption of $N_2$ are very reproducible. The equilibrium amounts of $N_2$ adsorption were 0.0095 g $N_2$/g zeolite for powdered Na—X zeolite (FIG. 9) and 0.0073 g $N_2$/g zeolite for the two zeolite sheet formed samples (FIGS. 10 and 11). The rate of adsorption were estimated to about 0.008 g $N_2$ $min^{-1}$/g zeolite for raw Na—X zeolite (FIG. 9) and about 0.006 g $N_2$ $min^{-1}$/g zeolite for the two zeolite sheet formed samples (FIGS. 10 and 11).

The invention claimed is:

1. A pressure swing adsorption apparatus comprising a parallel passage contactor comprising an adsorbent material comprising adsorbent particulates and a polymer binder, fabricated into a reinforcement-free, self-supported, flexible, coherent sheet, wherein the adsorbent particulates consist of particles from a first group, either alone or admixed with particles from a second group, said particles from the first group include carbon nanoparticles, inorganic oxides nanoparticles, and ceramic nanoparticles and have particle sizes in the range from 10 to 200 nm, and said adsorbent particulates differ from said polymer binder.

2. The pressure swing adsorption apparatus of claim 1 where the adsorbent particles from the second group include activated carbon, inorganic oxides, ceramic materials, or synthetic polymeric resins and have particle sizes in the range from 0.2 μm to 100 μm.

3. The pressure swing adsorption apparatus of claim 1 where the adsorbent particulates have the BET surface area, as measured by nitrogen adsorption, in the range of 200 to 2500 $m^2$/g, and the micropore volume in the range 0.2 to 1 $cm^3$/g.

4. The pressure swing adsorption apparatus of claim 1 where the carbon nanoparticles are surface modified with diazonium salts derivatives to attach specific chemical groups with enhanced gas adsorption or reaction properties.

5. The pressure swing adsorption apparatus of claim 1 where the inorganic oxides nanoparticles are surface modified to enhance gas adsorption or reaction.

6. The pressure swing adsorption apparatus of claim 1 where the particles from said second group are impregnated with inorganic salts, inorganic oxides, inorganic acids, inorganic bases, organic acids, amines, amides, acid chlorides for enhanced gas adsorption or reaction properties.

7. The pressure swing adsorption apparatus of claim 1 where the sheet thickness is in the range of 50 to 1000 μm.

8. The pressure swing adsorption apparatus of claim 1 where the open porosity (void volume fraction) of the sheet is in the range of 30 to 95%.

9. The pressure swing adsorption apparatus of claim 1 where the sheet surface area to total sheet volume ratio is in the range 200 to 2500 $m^2/cm^3$ and the sheet micro pore volume to total sheet volume ratio is in the range 0.1 to 0.9.

10. The pressure swing adsorption apparatus of claim 1 where said polymer binder is polyethylene, polypropylene, polytetrafluoroethylene (PTFE), polyvinylchloride (PVC), polyvinylidenechloride (PVDC), polyvinylidenefluoride (PVDF), polyamide, cellulose, cellulose derivates, or any other natural or synthetic polymer that is capable of suspending adsorbent particles in a random manner.

11. The pressure swing adsorption apparatus of claim 1 where the polymer binder is present in the range of 3–30 wt %.

12. The pressure swing adsorption apparatus of claim 1 where the sheet tensile strength is greater than 2 $kg/cm^2$ and where the sheet is flexible and bendable.

13. The pressure swing adsorption apparatus of claim 1 further wherein the adsorbent particulates from the first group are one of the following forms of carbon: carbon nanotubes, carbon fullerenes, or carbon black.

14. The pressure swing adsorption apparatus of claim 13 where the electrical resistivity of the adsorbent material sheet is lower than 200 ohm-cm and the current distribution is uniform.

15. The pressure swing adsorption apparatus of claim 13 further wherein the adsorbent particulates from the second group are activated carbon particles or activated carbon fibers.

16. The pressure swing adsorption apparatus of claim 1 further wherein the particulates from the first group are natural or synthetic zeolites.

17. The pressure swing adsorption apparatus of claim 1 where the sheet is spiral wound or where multiple sheets are layered with gaps between adjacent sheets to allow the flow of gas parallel to the sheet surface.

18. The pressure swing adsorption apparatus of claim 17 where the sheets are separated by polymer netting, by polymer bumps screen printed on the sheet, by corrugation of the sheet, by indents and embosses formed in the sheets, or configured in a honeycomb design.

19. The pressure swing adsorption apparatus of claim 18 where the sheet is made from the adsorbent material of claim 16.

20. The pressure swing adsorption apparatus of claim 19 where the sheet is electrically contacted at opposing ends.

21. The pressure swing adsorption apparatus of claim 17 where an impermeable casing surrounds the contactor and provides connections for gas inlet and outlet.

22. The pressure swing adsorption apparatus of claim 21 where the air permeability measured between inlet and outlet is greater than $10^{-15}$ $m^2$.

23. The pressure swing adsorption apparatus of claim 21 where the ratio of total micropore volume to total parallel passage contactor volume is in the range 0.05 to 0.7.

24. The pressure swing adsorption apparatus of claim 21 wherein said adsorbant material further comprises a heterogeneous catalyst.

25. The pressure swing adsorption apparatus of claim 21 wherein said apparatus is a gas filtration device.

26. The pressure swing adsorption apparatus of claim 21 wherein said apparatus is an air dehumidifier.

27. The pressure swing adsorption apparatus of claim 21 wherein said apparatus separates air components.

28. The pressure swing adsorption apparatus of claim 1 further wherein the adsorbent particulates from the second group are activated carbon particles or activated carbon fibers.

29. A pressure swing adsorption parallel passage contactor comprising an adsorbent material comprising adsorbent particulates and a polymer binder, fabricated into a reinforcement-free, self-supported, flexible, coherent sheet, wherein said sheet is spiral wound or layered with gaps between adjacent sheets to allow the flow of gas parallel to the sheet surface where an impermeable casing surrounds the contactor and provides connections for gas inlet and outlet.

30. A parallel passage contactor comprising an adsorbent material comprising adsorbent particulates and a polymer binder, fabricated on a substrate by tape casting or printing to form a sheet, where the substrate thickness is less than 60 microns.

* * * * *

UNITED STATES PATENT AND TRADEMARK OFFICE
CERTIFICATE OF CORRECTION

PATENT NO. : 7,077,891 B2  Page 1 of 1
APPLICATION NO. : 10/639157
DATED : July 18, 2006
INVENTOR(S) : Stephen Mosheim Jaffe and Cristian Ion Contescu It is certified that error appears in the above-identified patent and that said Letters Patent is hereby corrected as shown below:

Column 18, Line 40

In claim 19 delete the number "16" and insert the number --14--.

Signed and Sealed this

Thirty-first Day of October, 2006

JON W. DUDAS
*Director of the United States Patent and Trademark Office*

UNITED STATES PATENT AND TRADEMARK OFFICE
CERTIFICATE OF CORRECTION

PATENT NO. : 7,077,891 B2
APPLICATION NO. : 10/639157
DATED : July 18, 2006
INVENTOR(S) : Stephen Mosheim Jaffe and Cristian Ion Contescu It is certified that error appears in the above-identified patent and that said Letters Patent is hereby corrected as shown below:

Column 1, Line 3

Insert --CROSS REFERENCE TO RELATED APPLICATION This application claims priority from United States Provisional Patent Application No. 60/403,085, filed August 13, 2002-- under title.

Signed and Sealed this

Sixth Day of February, 2007

JON W. DUDAS
*Director of the United States Patent and Trademark Office*